(12) United States Patent
Noh

(10) Patent No.: US 6,610,109 B2
(45) Date of Patent: Aug. 26, 2003

(54) METHOD OF MANUFACTURING LITHIUM SECONDARY CELL

(75) Inventor: Hyung-gon Noh, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 133 days.

(21) Appl. No.: 09/852,843

(22) Filed: May 11, 2001

(65) Prior Publication Data

US 2002/0050054 A1 May 2, 2002

(30) Foreign Application Priority Data

May 12, 2000 (KR) .......................................... 00-25329

(51) Int. Cl.⁷ ............................................. H01M 10/04
(52) U.S. Cl. ................................... 29/623.3; 29/623.5
(58) Field of Search ............................ 29/623.1, 623.3, 29/623.5

(56) References Cited

U.S. PATENT DOCUMENTS

| | | |
|---|---|---|
| 4,472,487 A | 9/1984 | Maxfield et al. |
| 4,668,595 A | 5/1987 | Yoshino et al. |
| 5,028,500 A | 7/1991 | Fong et al. |
| 5,441,830 A | 8/1995 | Moulton et al. |
| 5,460,904 A | 10/1995 | Gozdz et al. |
| 5,540,741 A | 7/1996 | Gozdz et al. |
| 5,688,293 A * | 11/1997 | Oliver et al. ............... 29/623.1 |
| 6,235,065 B1 * | 5/2001 | Pasquier ................ 29/623.5 X |
| 6,328,770 B1 * | 12/2001 | Gozdz ................... 29/623.5 X |
| 6,391,069 B1 * | 5/2002 | Gozdz et al. ............... 29/623.3 |

* cited by examiner

Primary Examiner—Stephen Kalafut
(74) Attorney, Agent, or Firm—Staas & Halsey LLP

(57) ABSTRACT

A method of manufacturing a lithium secondary cell includes preparing an anode precursor and a cathode precursor by coating current collectors with electrode compositions, each not containing a plasticizer, preparing a separator precursor by coating both sides of a porous polymer film which is not gelled by an electrolytic solution with slurry containing an ion conductive polymer and the plasticizer, laminating the anode and cathode precursors and the separator precursor to prepare a cell precursor, and activating the cell precursor by injecting the electrolytic solution into the cell precursor. In the method of manufacturing method of the lithium secondary cell, the lithium secondary cell can be manufactured without a process of extracting a plasticizer using an organic solvent. Thus, environmental contamination due to plasticizer extraction can be prevented, thereby reducing the manufacturing cost of batteries.

22 Claims, 1 Drawing Sheet

METHOD OF MANUFACTURING LITHIUM SECONDARY CELL

CROSS REFERENCE TO RELATED APPLICATIONS

This application claims the benefit of Korean Application No. 00-25329, filed May 12, 2000, in the Korean Patent Office, the disclosure of which is incorporated herein by reference.

BACKGROUND OF THE INVENTION

1. Field of the Invention

The present invention relates to a method of manufacturing a lithium secondary cell, and more particularly, to a method of manufacturing a lithium secondary cell without a process of extracting a plasticizer by using an organic solvent.

2. Description of the Related Art

In general, a non-aqueous lithium secondary cell includes an anode, an electrolyte formed from at least one lithium salt dissolved in an organic solvent and a cathode of an electrochemical active material which is a transition metal chalcogenide. During discharging, lithium ions from the anode generate electrical energy and move to an electrochemical active material of the cathode that absorbs the lithium ions through the liquid electrolyte. During charging, the ion flow is reversed so that the lithium ions move from the electrochemical active material to the anode through the electrolyte to then be plated. Such non-aqueous lithium secondary cells are disclosed in U.S. Pat. Nos. 4,472,487, 4,668,595, 5,028,500, 5,441,830, 5,460,904 and 5,540,741.

To solve the problems of dendrite and sponge lithium growth, a metallic lithium anode is replaced with a carbon anode, e.g., coke or graphite, to which lithium ions are intercalated to form $Li_xC_6$. During charging, lithium ions come from a cathode active material and intercalate into the carbon anode to form a lithium-carbon intercalation compound. During the operation of such a cell, like in the cell having a metallic lithium anode, lithium ions move from the carbon anode to the cathode that absorbs the lithium ions through an electrolyte. During recharging, the lithium ions return to the anode to then be intercalated into the carbon. Since metallic lithium is not present in the cell, the anode does not melt at all even under severe conditions. Also, since lithium is recombined into the anode by intercalation rather than by plating, dendrite and sponge lithium growth does not occur.

Recently, lithium secondary cells using a porous polymeric matrix as a separator have emerged, and it has been proven that conductivity could improve by using the porous polymeric matrix. One of the methods for preparing a porous polymeric matrix includes the steps of forming a polymer structure containing a plasticizer such as dibutyl phthalate and forming voids in the polymer by removing the plasticizer. Further, the method includes adding plasticizer to the electrode active material composition for the purpose of forming pores in the electrode plates, to increase the amount of electrolytic solution impregnated in the cell, and enhancing the processing characteristics when the electrode plates and the separator are laminated together. 50 wt % or less of the plasticizer may be contained in the lithium secondary cell before it is removed. Currently, methods of removing the solvent include extraction using another organic solvent such as dimethyl ether, methanol or cyclohexane. In general, in the fabrication of a lithium secondary cell, an electrolytic solution containing an electrolytic solvent and salt is added for the purpose of activating a lithium secondary cell precursor after removing the plasticizer.

As described above, the lithium secondary cell using a plasticizer has an excellent electrochemically operating capacity. However, since the solvent used in extracting the plasticizer is a harmful organic solvent, it may cause environmental pollution. Also, performing extraction makes a manufacturing time longer and lowers a manufacture yield, which increases the manufacturing cost of a lithium secondary cell. Further, the loading amount of the electrode active material on the electrode plate is decreased because of the plasticizer.

SUMMARY OF THE INVENTION

To solve the above problems, it is an object of the present invention to provide a method of manufacturing a lithium secondary cell without a step of extracting a plasticizer using an organic solvent.

Accordingly, to achieve the above and other objects, there is provided a method of manufacturing a lithium secondary cell comprising preparing an anode precursor and a cathode precursor by coating collectors with electrode compositions, each not containing a plasticizer, preparing a separator precursor by coating both sides of a porous polymer film which is not gelled by an electrolytic solution with slurry containing an ion conductive polymer and the plasticizer, laminating the cathode and anode precursors and the separator precursor to prepare a cell precursor, and activating the cell precursor by injecting the electrolytic solution into the cell precursor.

The cell precursor is preferably formed in a bicell structure in which the cathode precursor, the separator precursor, the anode precursor, the separator precursor and the cathode precursor are stacked in sequence.

In the method of manufacturing a lithium secondary cell, each of the electrode compositions may further include an alcoholic solvent selected from the group consisting of methanol, ethanol, isopropanol and mixtures thereof.

The porous polymer film which is not gelled by an electrolytic solution is preferably a porous polyethylene film or a porous polyethylene film having a porous polypropylene film stacked on both surfaces thereof.

The plasticizer is preferably at least one selected from the group consisting of ethylene carbonate, propylene carbonate, dimethyl carbonate, diethoxyethane, dibutyl phthalate, dimethoxyethane, diethyl carbonate, dimethoxyethane, dipropyl carbonate and mixtures thereof.

The copolymer of vinylidenefluoride and hexafluropropylene is preferably coated to a thickness of 1 to 50 $\mu$m.

BRIEF DESCRIPTION OF THE DRAWINGS

The above objects and advantages of the present invention will become more apparent by describing in detail an embodiment thereof with reference to the attached drawing in which.

DESCRIPTION OF THE PREFERRED EMBODIMENTS

Figure 1:
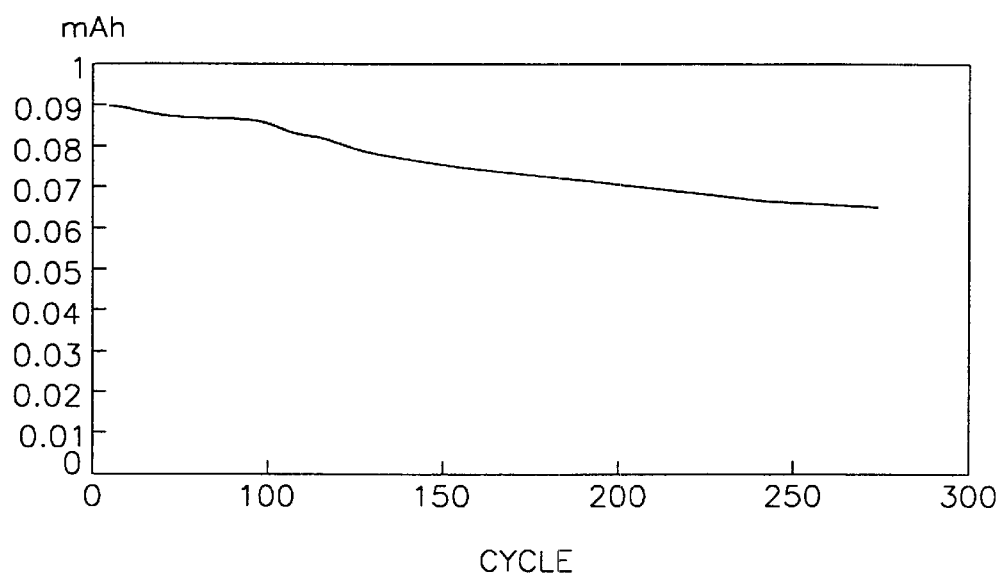
FIG. 1 is a graph showing a change in the capacity characteristics when charging and discharging cycles are repeated, in a lithium secondary battery prepared by Example 1 of the present invention.

Prior to describing the present invention in further detail, the following terms will first be defined.

The term "cell precursor" used herein means the structure of a cell prior to activation, and generally includes an anode precursor, a cathode precursor and a separator precursor. Also, the term "activation" means the placement of an electrolytic solution consisting of a non-aqueous organic solvent and a lithium compound releasing lithium into the solvent in an electrochemical cell precursor. After activation, the electrochemical cell is charged by an external energy source prior to use.

The term "cell" means a composite containing an anode, a cathode, a separator interposed therebetween, and containing a non-aqueous organic solvent and a lithium compound releasing lithium ions into the solvent. The composite is laminated on top of another composite to form a cathode/separator/anode/separator/cathode assembly, which is called a "bicell structure". Also, the term "battery" means two or more unit cells electrically interconnected in an appropriate series/parallel arrangement to provide the required operating voltage and current levels.

A method of manufacturing a unit lithium secondary cell according to the present invention will now be described in detail.

In general, a method of manufacturing a lithium secondary cell includes the steps of preparing an anode precursor, preparing a cathode precursor, preparing a separator precursor, preparing a cell precursor and activating, which will now be described in sequence.

1. Preparation of an anode precursor

An anode precursor is prepared by dissolving a polymeric binder into a casting solvent, adding the resultant solution to a mixture obtained by dry-mixing an anode active material and a conductive agent, and uniformly mixing the product to prepare an anode composition, and casting the same on an anode current collector, followed by drying.

Also, the anode composition may further include one alcoholic solvent selected from the group consisting of methanol, ethanol, isopropanol and mixtures thereof. Here, the alcoholic solvent is insoluble in the polymeric binder but is miscible with the casting solvent. The alcoholic solvent is removed in a subsequent drying process to serve to form pores in the anode precursor.

The volume ratio of the alcoholic solvent to the casting solvent in the mixture is preferably 1:3. If the volume of the casting solvent exceeds this range, there may be a problem in forming pores in the finally obtained anode precursor. If the volume of the casting solvent falls short of this range, it is difficult to obtain a uniform anode composition, which undesirably makes it difficult to cast the composition on a current collector uniformly.

The anode active material, the conductive agent, the polymeric binder and the casting solvent include materials generally used in the art. For example, carbon or graphite can be used as the anode active material. Also, usable conductive agents include carbon black. The polymeric binder can be at least one selected from fluorinated polymers such as polyvinyl alcohol, methyl cellulose, carboxymethyl cellulose, polyethyleneglycol or polyvinylidene fluoride. Also, usable casting solvents include N-methyl-2-pyrrolidone, acetone or mixtures thereof.

Also, usable anode current collectors include expanded metal, punched metal or foil made of copper.

2. Preparation of a cathode precursor

A cathode precursor is prepared by dissolving a polymeric binder into a casting solvent, adding the resultant solution to a mixture obtained by dry-mixing a cathode active material and a conductive agent, and uniformly mixing the product to prepare a cathode composition, and casting the same on a cathode current collector, followed by drying.

Also, the cathode composition may further include one alcoholic solvent selected from the group consisting of methanol, ethanol, isopropanol and mixtures thereof. Here, the alcoholic solvent is insoluble in the polymeric binder but is miscible with the casting solvent. The alcoholic solvent is removed in a subsequent drying process to serve to form pores in the cathode precursor.

The volume ratio of the alcoholic solvent to the casting solvent in the mixture is preferably 1:3. If the volume of the casting solvent exceeds this range, there may be a problem in forming pores in the finally obtained cathode precursor. If the volume of the casting solvent falls short of this range, it is difficult to obtain a uniform cathode composition, which undesirably makes it difficult to cast the composition on a current collector uniformly.

The cathode active material, the conductive agent, the polymeric binder and the casting solvent include materials generally used in the art. For example, $LiMn_2O_4$, $LiNiO_2$ or $LiCoO_2$ can be used as the cathode active material. Also, usable conductive agents include carbon black. The polymeric binder can be at least one selected from fluorinated polymers such as polyvinyl alcohol, methyl cellulose, carboxymethyl cellulose, polyethyleneglycol or polyvinylidene fluoride. Also, usable casting solvents include N-methyl-2-pyrrolidone, acetone or mixtures thereof.

Also, usable cathode current collectors include expanded metal, punched metal or foil made of aluminum.

3. Preparation of a separator precursor

A separator precursor is prepared by coating slurry containing a copolymer of vinylidenefluoride and hexafluoropropylene as an ion conductive polymer, a plasticizer, an inorganic filler and a coating solvent on both sides of a porous film which is not gelled by an electrolytic solution, and then drying the resultant structure at room temperature.

The porous film which is not gelled by an electrolytic solution can be any material which is well known in the art and includes, by way of example, nylon, polyolefin film, etc. Preferred porous films include porous polyethylene films formed by laminating a porous polypropylene film on or on both sides of a porous polyethylene film.

The copolymer of vinylidenefluoride and hexafluoropropylene is preferably coated to a thickness in the range of 1 to 50 $\mu$m. If the thickness is less than 1 $\mu$m, coating is difficult to perform. If the thickness is greater than 50 $\mu$m, the performance of a battery may deteriorate.

In the present invention, a separator has a structure in which ion conductive polymer is coated on a porous film which is not gelled by an electrolytic solution and has sufficient pores to impregnate an electrolytic solution for obtaining sufficient battery performance, without forming pores by extracting a plasticizer using an organic solvent.

Preferred plasticizers for use in fabricating separator precursors include at least one selected from the group consisting of ethylene carbonate, propylene carbonate, dimethyl carbonate, diethoxyethane, dibutyl phthalate, dimethoxyethane, diethyl carbonate, dimethoxyethane, dipropyl carbonate and mixtures thereof.

Particularly, use of electrolyte components as plasticizers leads to chemical equilibrium during injection of an electrolytic solution, thereby allowing enhancement of battery performance.

Also, the inorganic filler and the coating solvent can be any materials which generally function as such and include, by way of example, silica or alumina as the organic filler, and N-methyl-2-pyrrolidone, acetone or mixtures thereof as the coating solvent.

4. Preparation of a cell precursor

A cell precursor is prepared by laminating the prepared separator precursor between the anode precursor and the cathode precursor or laminating, in sequence, the cathode precursor, the separator precursor, the anode precursor, the separator precursor and the cathode precursor, and then heating or pressing the resultant structure. Methods and conditions of heating or pressing are well known to whose are skilled in the art.

5. Activation

Activation is completed by injecting an electrolytic solution having a non-aqueous organic solvent and an inorganic salt in its unit cell precursor, into an electrode assembly. The thus-activated cell is charged by an external energy source before it is used.

In the present invention, the plasticizer used in preparing the separator precursor is dispersed in the separator precursor in a liquid state. Since the plasticizer dispersed in the liquid state is an organic solution having the same kind of solvent as that of the electrolytic solution, the plasticizer is miscible with the electrolytic solution so that the electrolytic solution can be impregnated into the separator precursor without a separate process.

The non-aqueous organic solvent and an inorganic salt contained in the electrolytic solution can be any materials which generally function as such. In detail, examples of the non-aqueous organic solvent include at least one solvent selected from the group consisting of ethylene carbonate, propylene carbonate, γ-butyrolactone, 1,3-dioxolane, dimethoxyethane, dimethyl carbonate, diethyl carbonate, tetrahydrofuran, dimethylsulfoxide and polyethyleneglycol dimethylether. Preferred non-aqueous organic solvents include the same materials as the plasticizers used in preparing the separator precursor. Also, usable inorganic salts include lithium compounds dissociated in a solvent to release lithium ions. Examples of the inorganic salt include lithium perchlorate $LiClO_4$, lithium tetrafluoroborate $LiBF_4$, lithium hexafluorophosphate $LiPF_6$, lithium trifluoromethanesulfonate $LiCF_3SO_3$ and lithium bistrifluoromethanesulfornylamide $LiN(CF_3SO_2)_2$.

Although an example of the invention will hereinafter be described in detail, it is to be noted that the invention should not be limited to the example.

EXAMPLE 1

65 g of a copolymer (VDF-HFP) of polyvinylidenefluoride (88 wt %) and hexafluoropropylene (12 wt %) (Kynar 2801, Elf-Atochem North America, Inc.) were mixed in 600 ml of acetone (Samchun Chemical Co. Ltd.) and stirred for 2 hours using a ball mill to prepare a solution. Then, 415 g of mesocarbon fiber (MCF) (Petoca Ltd.) and 20 g of Super-P carbon (M.M.M. Carbon Co.) were further added to the solution and stirred for 5 hours using a ball mill. 200 ml of ethanol was added to the solution and stirred for 24 hours to form an anode composition.

A copper (Cu) current collector was coated with the anode composition and then dried at 30° C. to prepare a porous anode precursor.

Separately from the above, 50 g of a copolymer (VDF-HFP) of polyvinylidenefluoride (88 wt %) and hexafluoropropylene (12 wt %) (Kynar 2801, Elf-Atochem North America, Inc.) were mixed in 600 ml of acetone (Samchun Chemical Co.:Ltd.) and stirred for 2 hours using a ball mill to prepare a solution. Then, 410 g of lithium cobalt oxide ($LiCoO_2$) (Nippon Chemical Industrial Co., Ltd.) and 40 g of Super-P carbon (M.M.M. Carbon Co.) were further added to the solution and stirred for 5 hours using a ball mill. 200 ml of ethanol was added to the solution and stirred for 24 hours to form a cathode composition.

An aluminum (Al) current collector was coated with the cathode composition and then dried at 30° C. to prepare a porous cathode precursor.

Subsequently, 6 g of a copolymer (VDF-HFP) of polyvinylidenefluoride (88 wt %) and hexafluoropropylene (12 wt %) (Kynar 2801, Elf-Atochem North America, Inc.) and 8 g of dibutyl phthalate (Aldrich Chemical Co.) and 6 g of silica (Carbot Corp.) were mixed in 50 ml of acetone (Samchun Chemical Co. Ltd.) and stirred for 6 hours using a ball mill to prepare slurry. Then, both surfaces of a 25 μm thick porous polyethylene film (Hoechst Cellanese Co.) were coated with the slurry and then dried at room temperature to prepare a separator precursor.

The thus-prepared anode precursor, cathode precursor and separator precursor were stacked in a bicell structure and laminated at 145° C. to prepare a cell precursor.

Thereafter, the obtained cell precursor was dried at 100° C. for 1 hour and then imbued with an electrolytic solution (1.15M $LiPF_6$ in EC:DMC:DEC being in the ratio of 1:1:2) under vacuum condition under an Ar gas atmosphere to complete a lithium secondary cell.

The cell prepared in the above-described manner was applied to a formation process with a charge capacity of 160.5 mAh. Then, discharge capacities and high-rate characteristics were measured and the results are shown in Table 1.

EXAMPLE 2

A lithium secondary cell was prepared in the same manner as in Example 1, with the exception being that the cell precursor was dried in a vacuum.

COMPARATIVE EXAMPLE 65 g of mesocarbon fiber (MCF) (Petoca Ltd.), 10 g of a copolymer (VDF-HFP) of polyvinylidenefluoride (88 wt %) and hexafluoropropylene (12 wt %) (Kynar 2801), 9.25 g of Super-P carbon (M.M.M. Carbon Co.) and 21.75 g of dibutyl phthalate (Aldrich Chemical Co.) were mixed in 700 ml of acetone (Samchun Chemical Co. Ltd.) to form an anode composition.

A copper (Cu) current collector was coated with the anode composition and then dried at 30° C. to prepare a porous anode precursor.

Separately from the above, 65 g of lithium cobalt oxide ($LiCoO_2$) (Nippon Chemical Industrial Co., Ltd.), 10 g of a copolymer (VDF-HFP) of polyvinylidenefluoride (88 wt %) and hexafluoropropylene (12 wt %) (Kynar 2801), 6.5 g of Super-P carbon (M.M.M. Carbon Co.) and 18.5 g of dibutyl phthalate (Aldrich Chemical Co.) were mixed in 900 ml of acetone (Samchun Chemical Co. Ltd.) to form a cathode composition.

An aluminum (Al) current collector was coated with the cathode composition and then dried at 30° C. to prepare a porous cathode precursor.

32 g of a copolymer (VDF-HFP) of polyvinylidenefluoride (88 wt %) and hexafluoropropylene (12 wt %) (Kynar 2801), 26 g of silica (Carbot Corp.) and 42 g of dibutyl phthalate (Aldrich Chemical Co.) were mixed in 300 ml of acetone (Samchun Chemical Co. Ltd.) to form a separator composition. The separator composition was cast on polyethyleneterephthalate support and dried at 30° C. Then, a film was peeled off from the support to prepare a separator precursor.

The thus-prepared anode precursor, cathode precursor and separator precursor were stacked in a bicell structure and laminated at 145° C. to prepare a cell precursor.

Thereafter, the obtained cell precursor was immersed in stirred dimethyl ether to extract a substantial portion of the plasticizer, and then imbued with an electrolytic solution (1.15M $LiPF_6$ in EC:DMC:DEC being in the ratio of 1:1:2) under vacuum condition under an Ar gas atmosphere to compete a lithium secondary cell.

The cell prepared in the above-described manner was applied to a formation process with a charge capacity of 160.5 mAh. Then, discharge capacities and high-rate characteristics were measured and the results are shown in Table 1.

TABLE 1

|  | Formation | | | Standard discharge capacity | High-rate characteristic | | |
| --- | --- | --- | --- | --- | --- | --- | --- |
|  | Charge capacity | Discharge capacity | Reversible capacity | 0.2 C | 0.5 C | 1 C | 2 C |
| Example | 160.5 mAh | 124.0 mAh | 77.3% | 113.6 mAh | 106.1 mAh | 98.6 mAh | 65.0 mAh |
| Comparative Example | 160.5 mAh | 130.2 mAh | 81.1% | 120.5 mAh | 110.2 mAh | 97.5 mAh | 84.2 mAh |

As shown in Table 1, the measurement results for the cell prepared in the Example without a plasticizer extraction process using an organic solvent, were substantially the same as those for the conventional cell prepared in the Comparative Example.

As described above, in the method of manufacturing a lithium secondary cell according to the present invention, the lithium secondary cell can be manufactured without a process of extracting a plasticizer using an organic solvent. Thus, environmental contamination due to plasticizer extraction can be prevented, thereby reducing the manufacturing cost of cells.

FIG. 1 shows the lifetime characteristics of the lithium secondary all prepared by Example 1. The charging and discharging were performed at 25° C. at a rate of 1C, and the charging voltage was 2.5–4.2V. Referring to FIG. 1, it was confirmed that the cell of Example 1 had a good lifetime characteristic.

While the invention has been described in terms of a specific embodiment, the description of the present invention is intended to be illustrative and it will be apparent to one of ordinary skill in the art that various changes and equivalent embodiments can be made therein without departing from the spirit and scope thereof. Accordingly, it is intended that the appended claims be interpreted as covering all alterations and modifications as fall within the true spirit and scope of the invention.

What is claimed is:

1. A method of manufacturing a lithium secondary cell comprising:
    preparing an anode precursor and a cathode precursor by coating current collectors with electrode compositions, each not containing a plasticizer;
    preparing a separator precursor by coating both sides of a porous polymer film which is not gelled by an electrolytic solution with slurry containing an ion conductive polymer and a plasticizer;
    laminating the anode and cathode precursors and the separator precursor to prepare a cell precursor; and
    activating the cell precursor by injecting the electrolytic solution into the cell precursor.

2. The method according to claim 1, wherein the ion conductive polymer is a copolymer of vinylidenefluoride and hexafluoropropylene.

3. The method according to claim 1, wherein the cell precursor is formed in a bicell structure in which the cathode precursor, the separator precursor, the anode precursor, the separator precursor and the cathode precursor are stacked in sequence.

4. The method according to claim 1, wherein each of the electrode compositions comprises a casting solvent and an alcoholic solvent selected from the group consisting of methanol, ethanol, isopropanol and mixtures thereof.

5. The method according to claim 1, wherein the porous polymer film which is not gelled by the electrolytic solution is a porous polyethylene film.

6. The method according to claim 1, wherein the porous polymer film which is not gelled by the electrolytic solution is a porous polyethylene film having a porous polypropylene film stacked on both surfaces thereof.

7. The method according to claim 1, wherein the plasticizer is at least one selected from the group consisting of ethylene carbonate, propylene carbonate, dimethyl carbonate, diethoxyethane, dibutyl phthalate, dimethoxyethane, diethyl carbonate, dimethoxyethane, dipropyl carbonate and mixtures thereof.

8. The method according to claim 2, wherein the copolymer of vinylidenefluoride and hexafluoropropylene is coated to a thickness of 1 to 50 $\mu$m.

9. The method according to claim 1, wherein the coating electrode compositions comprises:
    dissolving a polymeric binder in a casting solvent, adding the resultant solution to a mixture obtained by dry-mixing an anode active material and a conductive agent, and uniformly mixing the product to prepare the anode precursor;
    dissolving a polymeric binder in a casting solvent, adding the resultant solution to a mixture obtained by dry-mixing a cathode active material and a conductive agent, and uniformly mixing the product to prepare the cathode precursor.

10. The method according to claim 4, wherein a volume ratio of the corresponding alcoholic solvent to the corresponding casting solvent is approximately 1:3.

11. The method of claim 7, wherein the slurry for preparing the separator precursor comprises an organic filler selected from silica and alumina, and a coating solvent selected from N-methyl-2-pyrrolidone, acetone and mixtures thereof.

12. The method of claim 1, wherein upon the activating of the cell precursor, the plasticizer is dispersed in a liquid state in an organic solution having a same kind of solvent as that of the electrolytic solution.

13. The method of claim 12, wherein the plasticizer is miscible with the electrolytic solution so that the electrolytic solution is impregnated into the separator precursor.

14. The method of claim 7, wherein the electrolytic solution comprises:

a non-aqueous organic solvent; and an inorganic salt;

wherein the non-aqueous organic solvent includes at least one solvent selected from the group consisting of ethylene carbonate, propylene carbonate, γ-butyrolactone, 1,3-dioxolane, dimethoxyethane, dimethyl carbonate, diethyl carbonate, tetrahydrofuran, dimethylsulfoxide and polyethyleneglycol dimethylether, and the usable inorganic salts include lithium compounds dissociated in a solvent to release lithium ions.

15. The method of claim 14, wherein the inorganic salt includes one of the group consisting of lithium perchlorate $LiClO_4$, lithium tetrafluoroborate $LiBF_4$, lithium hexafluorophosphate $LiPF_6$, lithium trifluoromethanesulfonate $LiCF_3SO_3$ and lithium bistrifluoromethanesulfornylamide $LiN(CF_3SO_2)_2$.

16. The method of claim 1, wherein:

the preparing of the anode precursor comprises mixing a copolymer (VDF-HFP) of polyvinylidenefluoride and hexafluoropropylene in acetone and stirring to prepare a first solution, adding mesocarbon fiber (MCF) and carbon to the first solution and stirring to prepare a second solution, adding ethanol to the second solution and stirring to form an anode composition, and coating a copper (Cu) current collector with the anode composition and then drying to prepare the anode precursor;

the preparing of the cathode precursor comprises mixing the copolymer (VDF-HFP) of and hexafluoropropylene in acetone and stirring to prepare a third solution, polyvinylidenefluoride adding lithium cobalt oxide ($LiCoO_2$) and carbon to the third solution and stirring to prepare a fourth solution, adding of ethanol to the fourth solution and stirring to form a cathode composition, and coating an aluminum current collector with the cathode composition and then drying to prepare the cathode precursor;

the preparing of the separator precursor comprises mixing the copolymer (VDF-HFP) of polyvinylidenefluoride and hexafluoropropylene and dibutyl phthalate and silica in acetone and stirring to prepare the slurry, coating both surfaces of a porous polyethylene film with the slurry and then drying to prepare the separator precursor;

the activating of the cell precursor comprises imbuing the cell precursor with the electrolytic solution of $LiPF6$ in EC:DMC:DEC under an Ar gas atmosphere to produce the lithium secondary cell.

17. The method of claim 16, wherein the laminating comprises stacking the anode precursor, the cathode precursor and the separator precursor in a bicell structure and laminating the bicell structure to prepare the cell precursor, and vacuum-drying the cell precursor.

18. A method of manufacturing a lithium secondary cell comprising:

preparing an anode precursor and a cathode precursor, each not containing a plasticizer;

coating slurry containing a plasticizer on a porous polymer film, to prepare a separator precursor;

laminating the anode and cathode precursors and the separator precursors to prepare a cell precursor; and activating the cell precursor by injecting an electrolytic solution into the cell precursor.

19. The method of claim 18, wherein:

the slurry contains a copolymer, an organic filler and a coating solvent; and the porous film polymer film is not gelled by the electrolytic solution.

20. The method of claim 18, wherein upon the activating of the cell precursor, the plasticizer is dispersed in a liquid state in an organic solution having a same kind of solvent as that of the electrolytic solution.

21. A method of manufacturing a lithium secondary cell comprising:

preparing an anode precursor and a cathode precursor, each not containing a plasticizer;

preparing a separator precursor containing a plasticizer without extracting the plasticizer;

laminating the anode and cathode precursors and the separator precursor with the plasticizer to prepare a cell precursor; and activating the cell precursor by injecting an electrolytic solution into the cell precursor.

22. The method of claim 21, wherein upon the activating of the cell precursor, the plasticizer that is dispersed in a non-aqueous organic solvent allows the electrolytic solution to impregnate the separator precursor.

* * * * *

UNITED STATES PATENT AND TRADEMARK OFFICE
CERTIFICATE OF CORRECTION

PATENT NO. : 6,610,109 B2  Page 1 of 1
DATED : August 26, 2003
INVENTOR(S) : Hyung-gon Noh It is certified that error appears in the above-identified patent and that said Letters Patent is hereby corrected as shown below:

Column 9,
Line 42, after "of" insert -- polyvinylidenefluoride --.
Line 44, delete "polyvinylidenefluoride".

Signed and Sealed this

Ninth Day of December, 2003

JAMES E. ROGAN
*Director of the United States Patent and Trademark Office*